(12) United States Patent
Hobson

(10) Patent No.: US 9,691,524 B2
(45) Date of Patent: Jun. 27, 2017

(54) SYSTEMS AND METHODS FOR APPLYING METALLIC LAMINATES TO CABLES

(71) Applicant: ABB Technology AG, Zurich (CH)

(72) Inventor: Robert Wayne Hobson, Cornelius, NC (US)

(73) Assignee: NKT HV Cables GmbH, Baden (CH)

( * ) Notice: Subject to any disclaimer, the term of this patent is extended or adjusted under 35 U.S.C. 154(b) by 0 days.

(21) Appl. No.: 14/563,625

(22) Filed: Dec. 8, 2014

(65) Prior Publication Data

US 2016/0163418 A1    Jun. 9, 2016

(51) Int. Cl.
| | | |
|---|---|---|
| *H01B 7/00* | (2006.01) |
| *H01B 7/285* | (2006.01) |
| *H01B 7/02* | (2006.01) |
| *H01B 13/22* | (2006.01) |
| *H01B 13/14* | (2006.01) |
| *H01B 13/24* | (2006.01) |
| *H01B 13/26* | (2006.01) |
| *H01B 7/282* | (2006.01) |

(52) U.S. Cl.
CPC .......... *H01B 7/285* (2013.01); *H01B 7/0275* (2013.01); *H01B 7/2825* (2013.01); *H01B 13/14* (2013.01); *H01B 13/221* (2013.01); *H01B 13/24* (2013.01); *H01B 13/2653* (2013.01)

(58) Field of Classification Search
CPC .......... H01B 9/02; H01B 9/022; H01B 9/023; H01B 9/025; H01B 9/9026; H01B 13/08; H01B 13/10; H01B 13/14; H01B 13/22; H01B 13/26; H01B 13/2613; H01B 13/2633; H01B 13/2646

USPC .............. 174/102 R, 102 A, 106 R, 107, 108
See application file for complete search history.

(56) References Cited

U.S. PATENT DOCUMENTS

| | | | | | |
|---|---|---|---|---|---|
| 2,090,744 | A | * | 8/1937 | Boe | H01B 13/0003 |
| | | | | | 156/390 |
| 2,105,168 | A | * | 1/1938 | Staples | H01B 7/202 |
| | | | | | 174/102 R |
| 2,121,942 | A | * | 6/1938 | Barrett | H01B 13/2646 |
| | | | | | 138/121 |
| 2,387,829 | A | * | 10/1945 | Burnham | H01B 7/00 |
| | | | | | 174/102 E |
| 2,459,877 | A | * | 1/1949 | Gillis | H01B 13/2613 |
| | | | | | 156/466 |
| 2,527,172 | A | * | 10/1950 | Beaver | H01B 7/22 |
| | | | | | 174/106 R |
| 2,589,700 | A | * | 3/1952 | Johnstone | H01B 7/202 |
| | | | | | 174/106 R |

(Continued)

FOREIGN PATENT DOCUMENTS

DE    1540430    1/1970

OTHER PUBLICATIONS

PCT Search Report and Written Opinion; European Patent Office; PCT Patent Application No. PCT/US2015/063736 Mar. 18, 2016, 5 pages.

*Primary Examiner* — William H Mayo, III
(74) *Attorney, Agent, or Firm* — Taft Stettinius & Hollister LLP

(57) ABSTRACT

A laminated cable includes a metal laminate surrounding a cable core having first and second ends. Solder is applied adjacent the ends of the laminate, and is heated and subsequently cooled to form a metal seal. The solder can be melted in a plastic jacketing extruder as the extruder applies a plastic jacket over the metal laminate.

17 Claims, 9 Drawing Sheets

(56) References Cited

U.S. PATENT DOCUMENTS

| | | | |
|---|---|---|---|
| 2,688,652 A * | 9/1954 | Schumacher | H01B 7/202 |
| | | | 174/102 C |
| 3,002,162 A * | 9/1961 | Garstang | H01R 13/7197 |
| | | | 174/115 |
| 3,629,489 A | 12/1971 | Jachimowicz et al. | |
| 3,634,606 A | 1/1972 | Iyengar | |
| 4,145,567 A * | 3/1979 | Bahder | H01B 7/2825 |
| | | | 156/56 |
| 4,980,001 A | 12/1990 | Cornibert | |
| 2002/0003046 A1 * | 1/2002 | Clouet | H01B 11/183 |
| | | | 174/108 |

* cited by examiner

US 9,691,524 B2

SYSTEMS AND METHODS FOR APPLYING METALLIC LAMINATES TO CABLES

FIELD OF INVENTION

The present disclosure concerns metallic laminates for cables. In particular, the present disclosure concerns soldered seals for metallic cable laminates.

BACKGROUND

High and medium voltage electrical cables can implement metallic laminations that protect the cable interior from environmental contaminants, one of the most significant of which is moisture. Extruded tubular metal laminations provide a seamless and continuous metal cover through which contaminants are virtually unable to migrate. While such laminations protect the interior of the cable from contamination, processes for constructing tubular metal lamination can require specialized machinery to coextrude the tube around the interior of the cable. Metallic laminations that are not tubular but instead are wrapped around the cable core and sealed, for example by application of a hot-melt adhesive at a seam formed by overlapping opposite ends of the laminations, can be easier and less costly to manufacture relative to producing a tubular extruded lamination. However, such adhesives can potentially be more porous than the extruded metal. Thus, an improved metallic lamination for electrical cables is desirable.

SUMMARY

A laminated cable includes a metal laminate surrounding a cable core having first and second ends. Solder is applied adjacent the ends of the laminate, and is heated and subsequently cooled to form a metal seal. The solder can be melted in a plastic jacketing extruder as the extruder applies a plastic jacket over the metal laminate.

BRIEF DESCRIPTION OF THE DRAWINGS

In the accompanying drawings, structures and methods are illustrated that, together with the detailed description provided below, describe aspects of cables having metallic laminations with solder seals, and systems and methods for constructing such cables. It will be noted that a single component can be designed as multiple components or that multiple components can be designed as a single component. Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
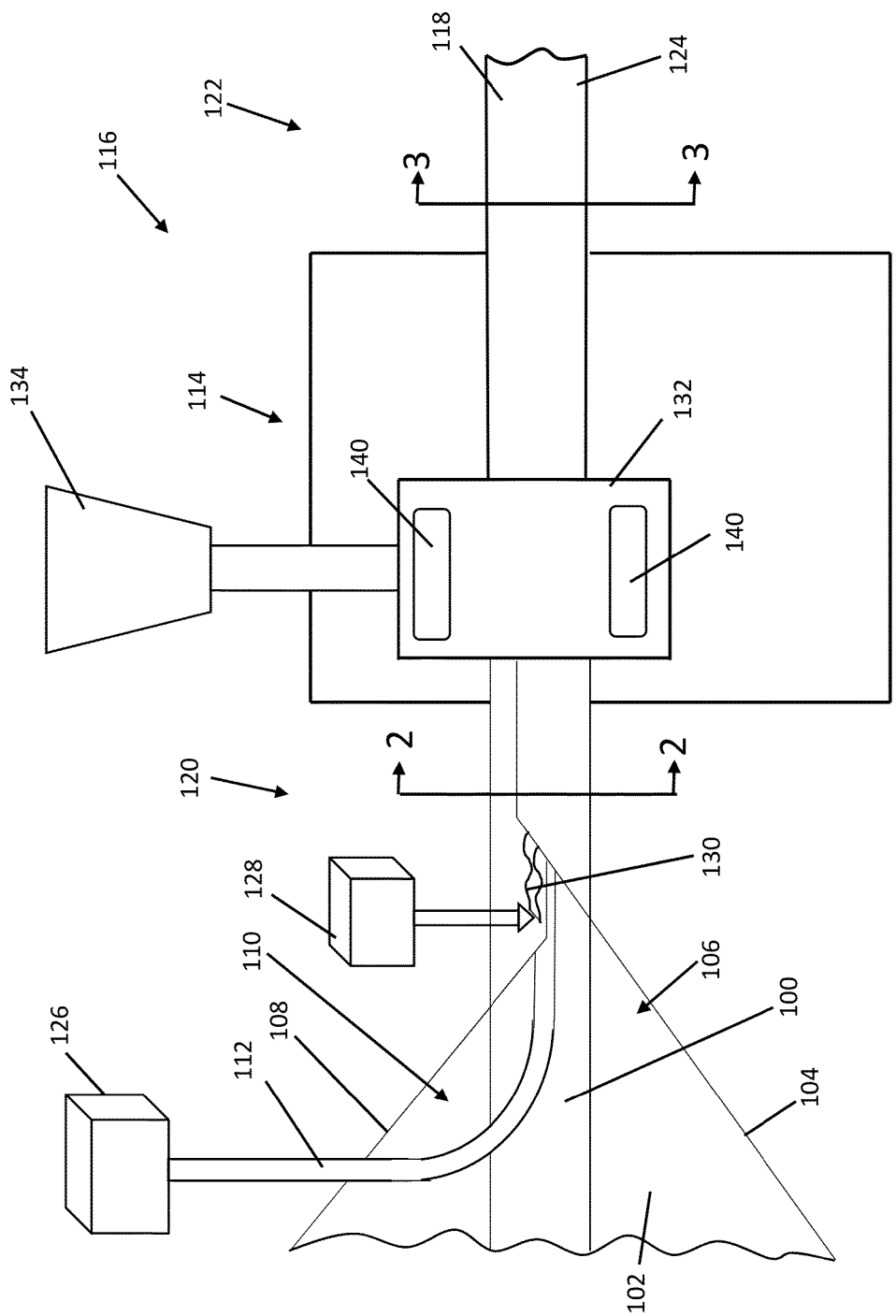
FIG. 1 illustrates a schematic of a portion of the assembly process for cable 124.

With reference to FIG. 1, according to one aspect of the present teachings a conducting cable core 100, such as can be found in medium to high voltage AC or DC cables, can be surrounded by a metallic laminate 102 having a first edge 104 at one circumferential end 106 of the laminate 102 and a second edge 108 at another circumferential end 110 of the laminate 102. It should be noted that the cable core 100 need not be electrically conductive but can include other materials, including but not limited to a fiber optic cable core. According to one aspect of the present teachings, the laminate 102 is wrapped around the circumference of the core 100 such that the opposite ends 106, 110 overlap one another. According to another aspect of the present teachings, a solder tape 112 is disposed near the region where the opposite ends 106, 110 overlap. With reference to FIG. 1, as the cable core 100 is fed toward the extruder 116, a solder tape applicator 126 applies the solder tape 112 onto the core 100. In particular, the solder tape 112 is applied so to be adjacent and underneath both the first end 106 and second end 110. An adhesive dispenser 128 applies hot melt adhesive 130 between the overlapping first end 106 and second end 110. The laminate 102 can be wrapped around the core 100 by a variety of methods and devices, including but not limited to dies, molds or other shaping devices that forms sheet metal into a tubular form such that the first end 106 and second end 110 are disposed near the solder tape 112.

According to one aspect of the present teachings, the heat source 114 is a plastic jacket extruder 116. The extruder 116 forms a plastic jacket 118 that completely surrounds the metal laminate 102. The extruder 116 includes a heated extruder head 132 that takes plastic precursor, such as pellets, from hopper 134 and applies heat through heating elements 140 and frictional forces arising between the extruding screw and casing of the extruder head 132. The extruding screw within the head 132 applies pressure that forces the plastic through a die that forms the jacket 118 around the metallic laminate 102. According to one aspect of the present teachings, the jacket 118 can include polyethylene ("PE"), poly-vinyl chloride ("PVC") or other suitable plastics. The heating elements 140 can be electrically powered, or can utilize other sources of energy to generate heat. In addition to extruder 116, other forms of heat sources can be implemented according to the present teachings, including those separate from any jacketing equipment such as extruder 116. For example, dedicated heat sources can be implemented to heat the solder tape 112 and or the laminate 102 sufficiently to form a seal. Further, such heat sources can apply heat to the solder prior to or after applying the solder to any element of the cable.

With continued reference to FIG. 1, as the cable core 100 is fed from the input side 120 and passed through the extruder 116 to the output side 122, the heat within the extruder 116 melts the solder on the solder tape 112. Further, as the plastic jacket cools, it contracts, applying pressure to the laminate 102 and melted solder and ensuring contact between the solder and the first end 106 and second end 110 of the laminate 102. The solder cools to form a hermetic metallic seal in the jacketed cable 124 that exits the output side 122.

Figure 2:
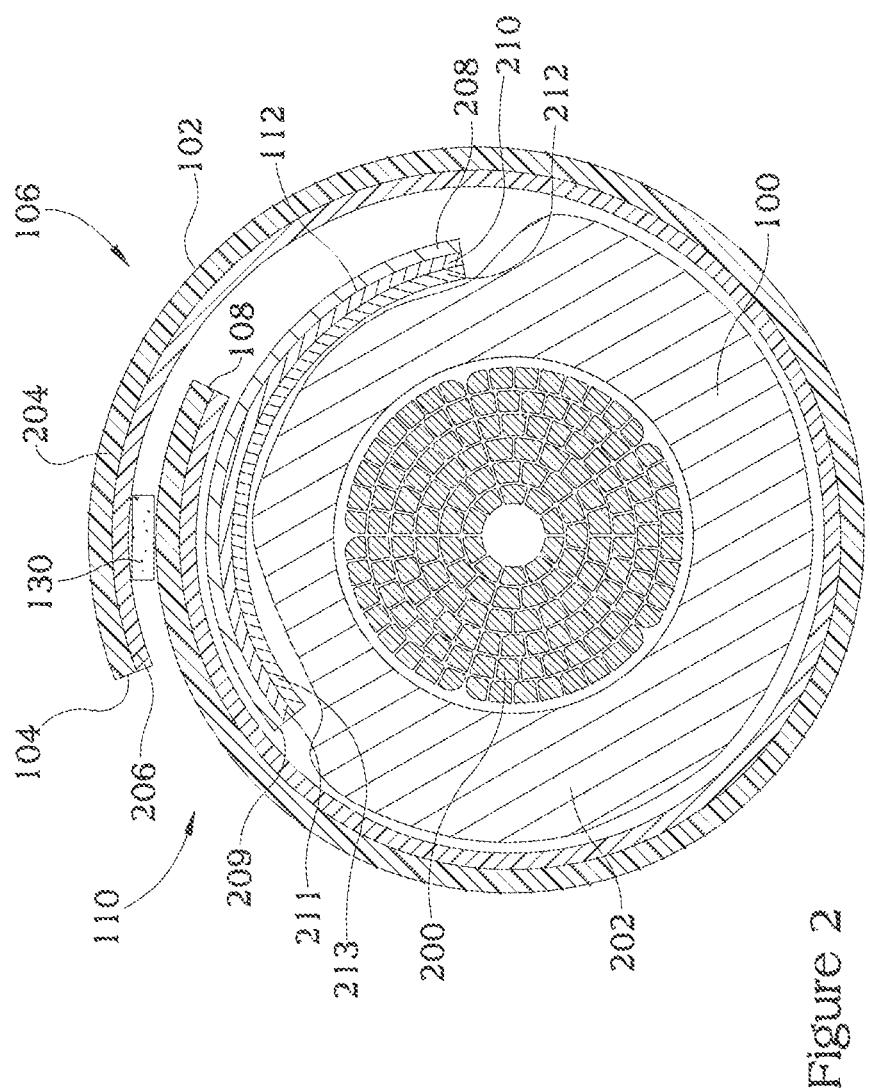
FIG. 2 illustrates a sectional view along the line 2-2 shown in FIG. 1.

With reference to FIG. 2, the cable core 100 includes a conductor 200 in the form of a bundle of wires centrally disposed within the cable core 100. According to another aspect of the present teachings the type of conductor can vary, and can include but is not limited to Milliken style segmented conductors. The conductor can be formed of copper, aluminum or other conductive metals. The core 100 can also include reinforcing centers made of plastic. In addition to Milliken style conductors, other forms of separate conductors can be implemented according to the present teachings, including cable having three or more isolated conductors. With continued reference to FIG. 2, an insulation layer 202 surrounds the cable core 100 and can include, for example, impregnated paper, cross-linked polyethylene (XLPE), tree-resistant XLPE (TR-XLPE) and ethylene propylene rubber (EPR), among other materials. Additional layers that are not illustrated include screens of semiconductive material surrounding the conductor 200, semiconductive material surrounding the insulation layer 202, and metallic sheaths, screens or shields that serve various purposes such as improving the mechanical or electrical properties qualities of the cable 124. A variety of combinations of such materials and layers can be implemented in accordance with the present teachings.

As shown in FIG. 2, the laminate 102 is wrapped around the core 100 so that portion of the second end 110 overlaps a portion of the first end 106. The laminate 102 has a plastic coating 204 disposed radially outward of a metal layer 206. The solder tape 112 is disposed radially inward of both the first end 106 and second end 110, and overlaps both the first end 106 and second end 110. According to one aspect of the present teachings, the solder 210 in layer 211 is a low temperature solder, and has melting temperatures between about 50 degrees Celsius to about 183 degrees Celsius. According to another aspect of the present teachings, the selected solder can have melting temperatures between about 50 degrees Celsius to about 100 degrees Celsius. According to yet other aspects of the present teachings, the selected solder can have melting temperatures between about 100 degrees Celsius to about 183 degrees Celsius. The solder can be eutectic or non-eutectic, and can include tin, lead, bismuth, or other elements. Temperatures from the heat source 114 depicted in FIG. 1 can rise above 200 degrees Celsius, which is sufficient to melt the solder 210 and flux 208 of the solder tape 112. According to another aspect of the present teachings, a metallic solder can be chosen with a melting temperature higher than the temperature that can be achieved through application of heat from the extruder 116. In such cases, a separate heat source can apply the necessary heat to melt the solder, which can be done separately from jacketing the cable. In another aspect of the present teachings, solder having a melting temperature than can be achieved through use of the extruder 116 alone can be implemented. The heat required to melt the solder can also be supplied through an exothermic chemical reaction that, for example, supplies sufficient heat to the location where the solder meets the laminate.

The solder tape 112 includes flux 208 disposed in a layer 209 facing radially outward. The tape 112 also includes solder 210 disposed in a layer 211 underneath the flux layer 209 and a metal 212 that forms a substrate or base layer 213 on which the flux 208 and solder 210 are disposed. The solder 210 is disposed adjacent to the first end 106 and second end 110. As used herein, solder 210 is adjacent to the first end 106 and second end 110 even if there is flux 208 between the solder 210 and the first end 106 and second end 110. The flux layer 209 comes into contact with the metallic layer 206 of the laminate 102, which faces radially inward, when fed through the extruder 116. According to other aspects of the present teachings, flux is not necessary in order to form a seal. For example, selection of an appropriate solder in combination with metal 206 of the metal laminate 102 can form the desired seal without flux. According to one aspect of the present teachings, the metal layer 206 of the laminate 102 includes the same material as the metal layer 212 in the solder tape 112. According to another aspect of the present teachings, the metal layer 206 of the laminate 102 and metal layer 212 of the solder tape 112, are made of different metals, and can include one or more metals suitable for implementation as a metal laminate for a cable. While solder can be applied through application of solder tape 112, solder can also be applied directly to laminate 102, with or without flux and with or without a base layer. For example, solder can be applied directly to one or both of the first end 106 and second end 110 of the laminate 102 after any plastic coating has been removed. Flux can be introduced by a variety of methods, including separate application before or after solder is applied, or as an additive to a solder tape or strip such as flux layer 209 of solder tape 112.

Figure 3:
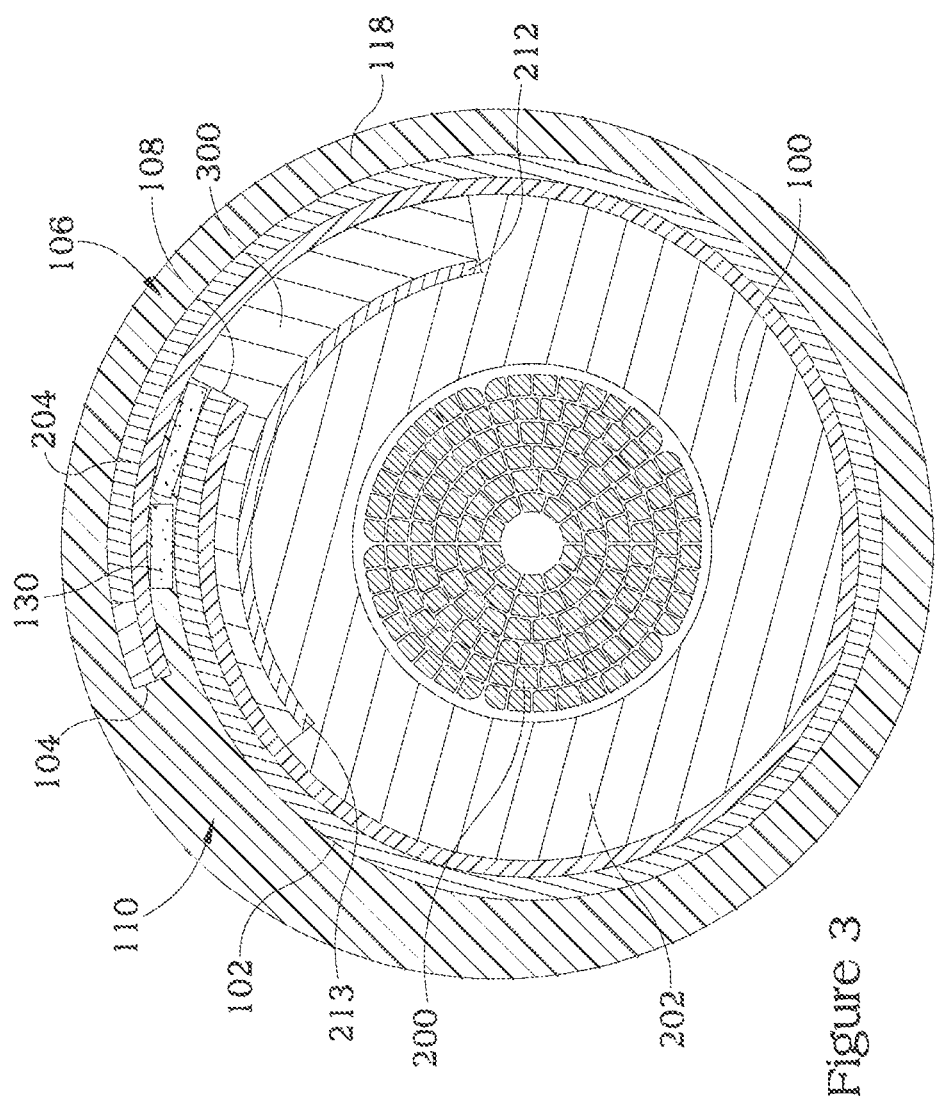
FIG. 3 illustrates a sectional view along the line 3-3 shown in FIG. 1.

With reference to FIG. 3, at the output side 122 of the extruder 116, the cable 124 is covered with a plastic jacket 118 that surrounds the metallic laminate 102. The jacket 118 cools and begins to shrink as the cable 124 moves away from the extruder 116. Shrinkage of the jacket 118 results in pressure applied to the solder tape 112 and first and second ends 106, 110, thereby pressing the solder tape 112 and ends 106, 110 together. The solder layer 208 present on the solder tape 112 has melted and formed a seal 300 that circumferentially overlaps at least a portion of the first end 106 and second end 110, coming in contact with and joining the first end 106 and second end 110 along the longitudinal axis of the cable 124. The solder forms a seal 300 and cools and hardens. The seal 300 and the metallic laminate 102 form a hermetic metal barrier between the cable core 100 and the environment. In addition, an optional adhesive 130 applied by dispenser 128 is disposed between the first end 106 and second end 110, aiding in securing the first end 106 and second end 110 into their positions relative to one another as shown in FIG. 3. The seal is disposed radially inward of the first end 106 and second end 110, and the metal base layer 213 is disposed radially inward of the seal 300.

Figure 5:
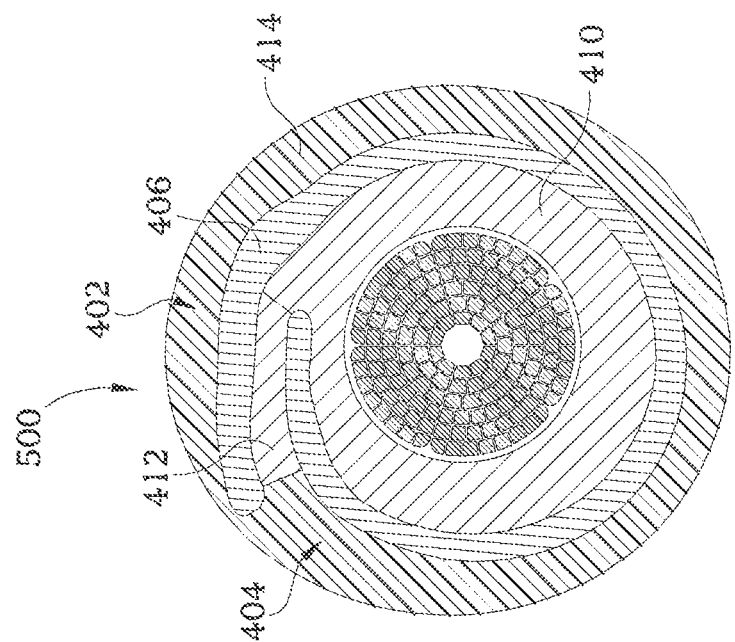
FIG. 5 illustrates a sectional view of a cable core 410 surrounded by laminate 406 after forming a seal 412.
Figure 4:
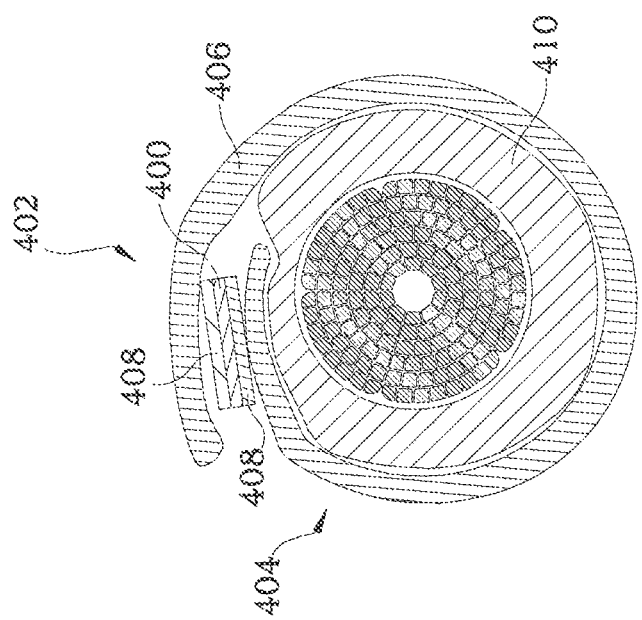
FIG. 4 illustrates a sectional view of a cable core 410 surrounded by laminate 406 prior to forming a seal 412.

With reference to FIG. 4, solder 400 can be disposed radially between the first end 402 and second end 404 of laminate 406. The solder 400 can be coated with flux 408 that comes into contact with the metal laminate 406. The laminate 406 surrounds cable core 410, and the first end 402 and second end 404 of the laminate 406 overlap. According to one aspect of the present teachings, any plastic coating that may be present on the surface of laminate 406, such as coating 204 shown in FIGS. 2 and 3, can be removed from the laminate 406 surface prior to applying solder or flux or both to the surface. Referring to FIG. 5, the solder 400, once sufficiently heated and subsequently cooled, will form a seal 412 disposed radially between the first end 402 and second end 404 and overlapping at least a portion of both the first end 402 and second end 404. Similarly to the configuration shown in FIG. 1, the cable core 410, surrounded by the laminate 406 and solder 400, can be fed through a plastic jacketing co-extruder to melt the solder 400 while extruding the plastic jacket 414.

Figure 7:
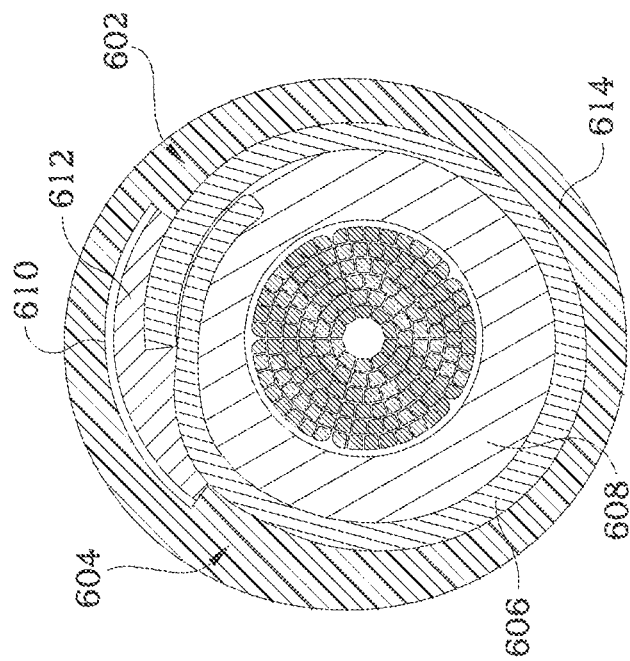
FIG. 7 illustrates a sectional view of a cable core 608 surrounded by laminate 606 after forming a seal 612.
Figure 6:
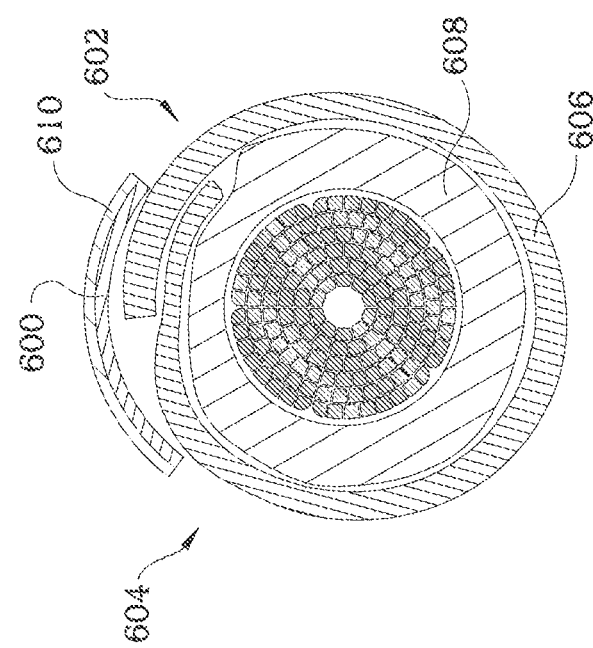
FIG. 6 illustrates a sectional view of a cable core 608 surrounded by laminate 606 prior to forming a seal 612.

With reference to FIG. 6, solder 600 can be disposed radially outward of a first end 602 and second end 604 of a laminate 606 surrounding a cable core 608. The solder 600 covers one side of a metallic backing strip 610. As shown in FIG. 7, solder 600 will form a seal 612 disposed radially outward of both the first end 602 and second end 604 and overlap at least a portion of both the first end 602 and second end 604. According to one aspect of the present teachings, the solder 600 can be applied to one of the first end 602 or second end 604 at a location adjacent to where the first end 602 and second end 604 come into contact or overlap. Similarly to the configuration shown in FIG. 1, the cable core 608 surrounded by the laminate 606 and solder 600 can be fed through a plastic jacketing co-extruder, which supplies sufficient heat to melt the solder 600 and extrude the plastic jacket 614.

Figure 9:
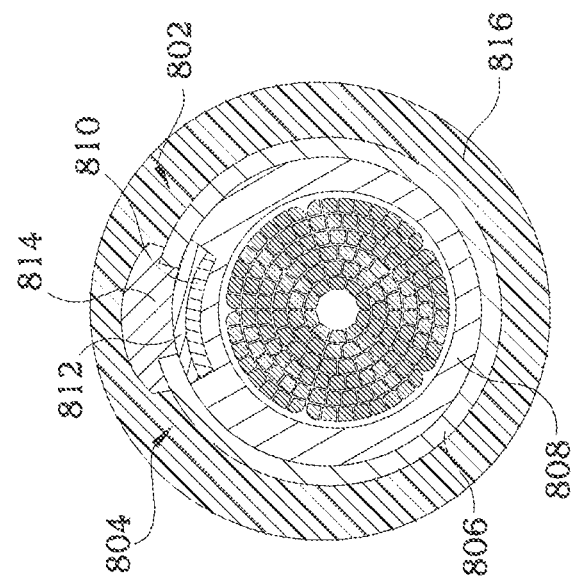
FIG. 9 illustrates a sectional view of a cable core 808 surrounded by laminate 806 after forming a seal 812.
Figure 8:
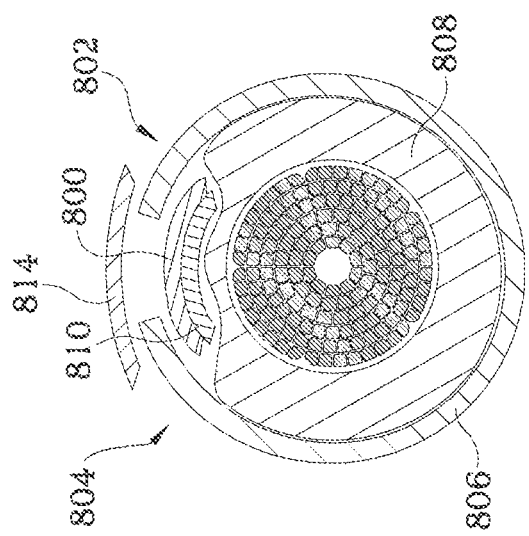
FIG. 8 illustrates a sectional view of a cable core 808 surrounded by laminate 806 prior to forming a seal 812.

With reference to FIG. 8, solder 800 can be disposed radially inward relative to a first end 802 and second end 804 of a laminate 806 that partially surrounds a cable core 808. The first end 802 and second end 804 of the laminate 806 do not overlap. The solder 800 covers one side of a metallic backing strip 810. An optional hot melt plastic ribbon 814 can be disposed to overlap the ends 802 and 804. The core 808, laminate 806, solder 800, and ribbon 814 can be fed through a jacketing co-extruder, which melts the solder 800 and extrudes the plastic jacket 816. As shown in FIG. 9, solder 800 will form a seal 812 joining the first end 802 and second end 804 and overlapping at least a portion of both.

Figure 10:
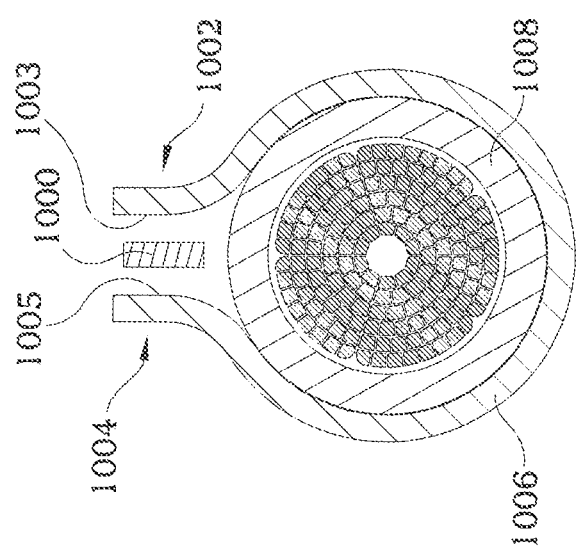
FIG. 10 illustrates a sectional view of a cable core 1008 surrounded by laminate 1006 prior to forming a seal 1010.
Figure 11:
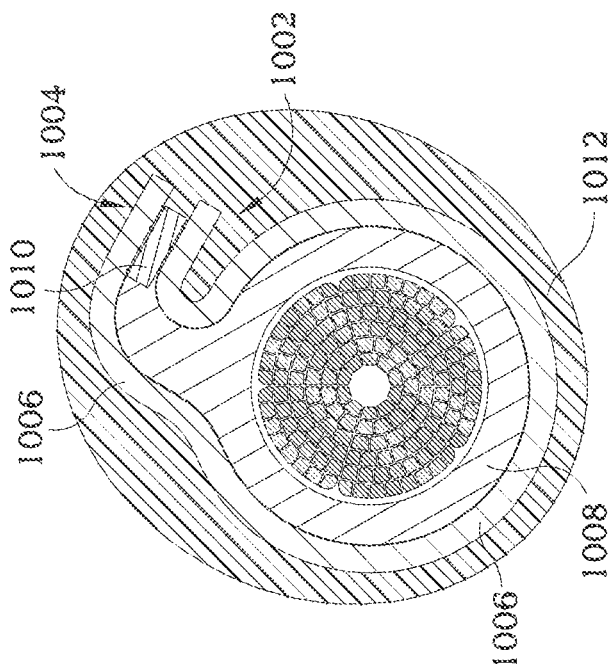
FIG. 11 illustrates a sectional view of a cable core 1008 surrounded by laminate 1006 after forming a seal 1010.

With reference to FIGS. 10 and 11, solder 1000 can be disposed between a first end 1002 and second end 1004 of a laminate 1006 that partially surrounds a cable core 1008. The first end 1002 and second end 1004 of the laminate 1006 are turned upward and away from the cable core 1008 such that the inner surfaces of the ends 1002, 1004 face one another. The solder 1000 can be applied between the inner surfaces 1003, 1005 of the ends 1002, 1004 without a backing strip. The ends 1002, 1004 can be brought together and the solder 1000 heated to form a seal 1010. The ends 1002, 1004 can be folded over before applying a jacket 1012, as shown in FIG. 11.

Figure 12:
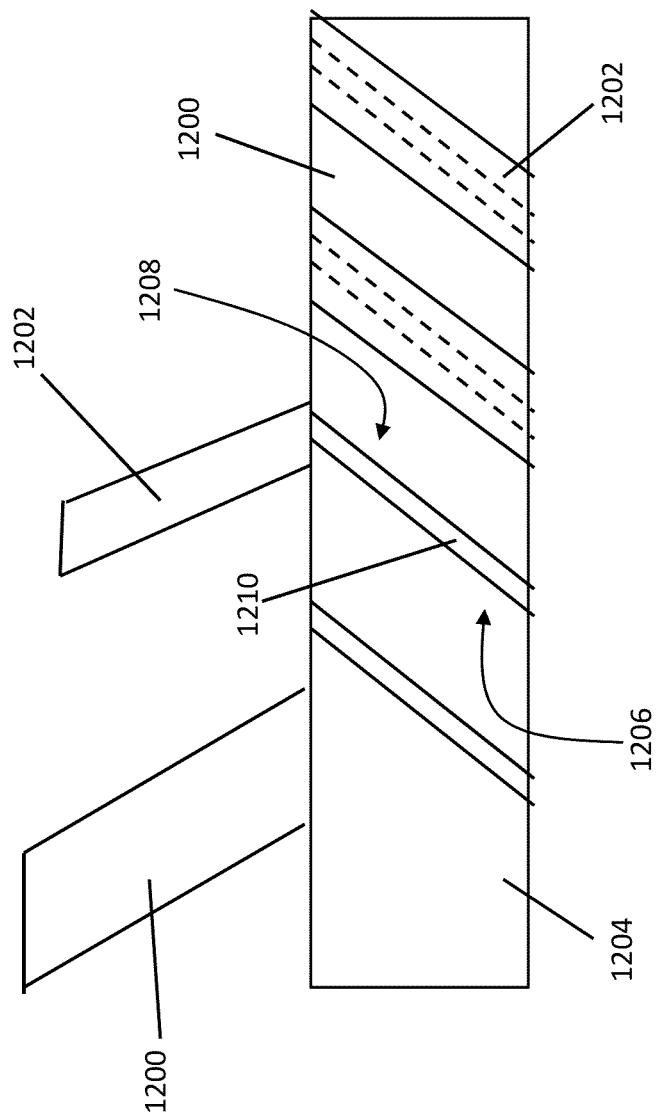
FIG. 12, illustrates a side view of a cable core 1204 partially wrapped with laminate 1200 and solder tape 1202.

With reference to FIG. 12, yet another aspect of the present teachings includes winding strips of both laminate 1200 and solder tape 1202 around a cable core 1204. The laminate 1200 is wound around core 1204 such that ends 1206, 1208 of the laminate are spaced apart by a gap 1210. The laminate 1200 can be followed by the solder tape 1202 which overlaps the gap 1210 and ends 1206, 1208. In yet another aspect of the present teachings, the solder tape 1202 can be wound around the core 1204 first, followed by the solder tape 1202. A metal backing can be used on the solder tape 1202 so to bridge the gap 1210 after a seal is formed by melting the solder tape 1202. When the solder tape 1202 is applied over the laminate 1200, the metallic backing can be disposed radially outwardly so to allow the solder and flux to be in contact with the laminate 1200. When the solder tape 1202 is applied to the core 1204 before the laminate 1200, the metallic backing can be disposed radially inwardly such that the solder and flux on strip 1202 can be in contact with the laminate 1200.

Solder can be applied in other configurations to form a seal at the circumferential ends of a laminate. According to one aspect of the present teachings, solder can bridge gaps between the edges of two opposing ends of a laminate that do not overlap. In such cases, a metallic backing strip having a solder coating can be placed over or under the gap between the two ends so to have solder interfacing with the metal layer 206 of the laminate 102. In addition, a laminate can include two or more solder seals applied according to the present teachings. According to yet other aspects of the present teachings, a single type of seal is used along the entire length of a cable 124.

Figure 13:
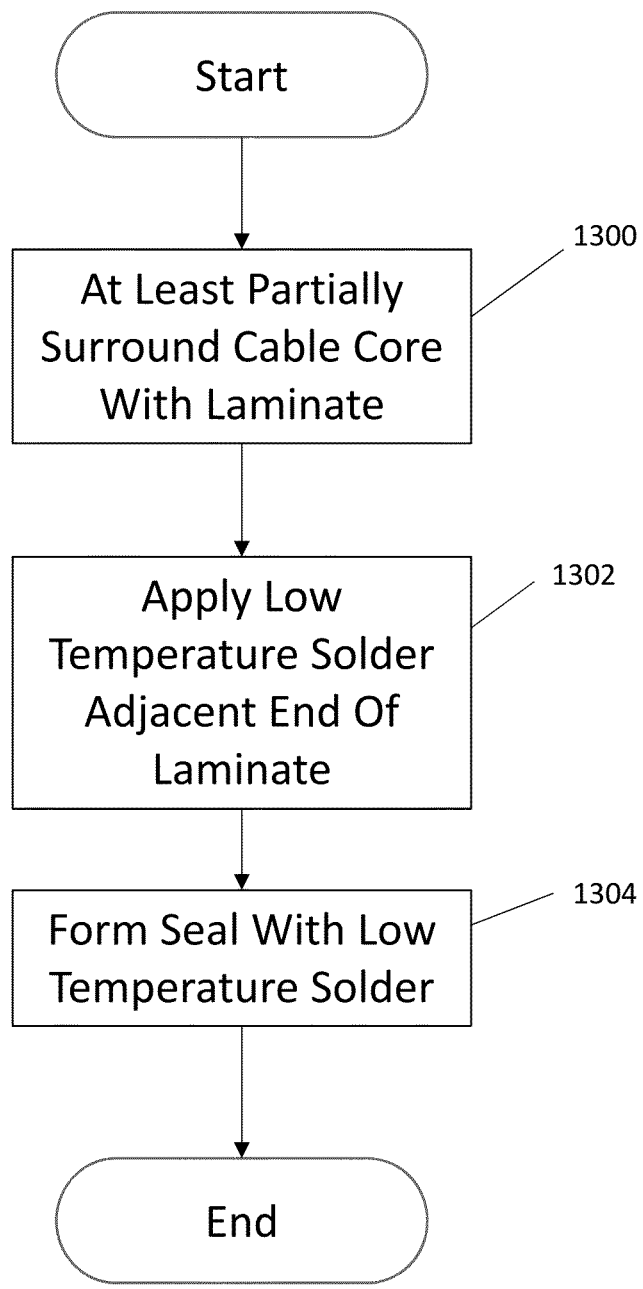
FIG. 13 illustrates steps of a method of making a cable according to the present teachings.

With reference to FIG. 13, a method for applying a laminate to cables such as cable 124 includes step 1300, in which a metallic laminate 102 is applied around a cable core 100 so to at least partially surround the core 100. In step 1302, solder is applied adjacent to at least one of a first and second end 106, 110 of the laminate 102. Solder such as solder 210 can be applied with a solder tape 112 that includes a metal backing and flux. Solder can also be applied in other ways, such as direct application of solder to the laminate. Step 1302 can be performed before, after or coincident to step 1300. According to other aspects of the present teachings, solder can be applied radially inward of both ends 106, 110 of the laminate 102, for example as shown in FIGS. 1-3 where the solder is disposed on a metal layer 212 radially inward of the solder 210 and flux 208 is disposed radially outward of the solder 210. According to yet another aspect of the present teachings, solder 400 can be applied between two overlapping ends 402, 404 of a laminate 406, as shown in FIGS. 4 and 5. According to still another aspect of the present teachings, solder 600 can be applied radially outward of two 602, 604 ends of a laminate 606, as shown in FIGS. 6 and 7. Such solder 600 can be applied, for example, with a metal strip 610 disposed radially outward of the laminate 606. According to yet another aspect of the present teachings, solder 800 can be applied across a gap between ends 802, 804 of a laminate 806, for example as shown in FIGS. 8 and 9. As depicted in FIGS. 10 and 11, solder 1000 can also be applied between ends 1002, 1004 which can then be folded over. According to still another aspect of the present teachings, laminate 1200 and solder 1202 tapes can be wound around cable core 1204. In step 1304, a seal is formed from the solder. To form the seal, a heat source can melt the solder sufficiently such that it can come into contact with the ends of a laminate and form a bond with the metal of the laminate after cooling. According to one aspect of the present teachings, the heat for melting the solder in step 1304 is supplied from a plastic jacketing co-extruder. For example, the laminate and solder surrounding a cable core can be fed through a jacketing extruder where the extruder applies a plastic jacket in a heated environment having sufficiently high temperature to melt the solder. Other sources of heat can be used in addition to extruders, and can be used to heat the solder at various times while forming a seal.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. To the extent that the terms "in" or "into" are used in the specification or the claims, it is intended to additionally mean "on" or "onto." As used herein, "about" will be understood by persons of ordinary skill in the art and will vary to some extent depending upon the context in which it is used. Unless otherwise understood by persons of ordinary skill in the art, "about" will mean up to plus or minus 10% of the particular term. From about A to B is intended to mean from about A to about B, where A and B are the specified values.

While the present disclosure illustrates various embodiments, and while these embodiments have been described in some detail, it is not the intention of the applicant to restrict or in any way limit the scope of the claimed invention to such detail. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

The invention claimed is:

1. A cable comprising:
a cable core;
a metallic jacket disposed radially outward relative to the core, the jacket having a first end and second end proximate to the first end, wherein at least a portion of the first end overlaps at least a portion of the second end; and
a seal including solder in contact with the first and second ends, wherein the seal is disposed radially inward of and in overlapping relation to both the first and second ends across the overlap of the first and second ends.

2. The cable of claim 1, further comprising a plastic coating around the metallic jacket and an adhesive radially inward of the portion of the first end and radially outward of the portion of the second end to adhere the overlapping portions of the first and second ends.

3. The cable of claim 1, wherein the solder is provided as a solder layer on a solder tape disposed radially inward of and in overlapping relation to both the first and second ends.

4. The cable of claim 1, wherein the solder tape includes a flux layer disposed over the solder layer and the solder layer is disposed on a metal base layer.

5. The cable of claim 1, wherein at least a portion of a metallic strip is disposed radially inward of the seal.

6. A method of making cable, comprising:
at least partially surrounding a cable core with a metallic laminate having a first circumferential end and second circumferential end, wherein at least a portion of the first circumferential end overlaps at least a portion of the second circumferential end;
disposing solder adjacent to the first circumferential end and second circumferential end, wherein the solder is disposed radially inward of and in overlapping relation to both the first and second circumferential ends; and,
forming a seal including the solder in contact with the first circumferential end and second circumferential end across the overlap of the first and second circumferential ends.

7. The method of claim 6, wherein the disposing step includes disposing a solder tape including a metal substrate layer and the solder adjacent the first circumferential end and second circumferential end.

8. The method of claim 7, wherein the substrate layer is radially inward relative to the solder.

9. The method of claim 7, wherein the solder tape further includes flux and the substrate layer is radially inward of the solder and the flux.

10. The method of claim 9, wherein the flux is provided in a layer of flux and the solder is provided in a layer of solder, such that the substrate layer is radially inward of the solder layer and the solder layer is radially inward of the flux layer.

11. The method of claim 10, wherein the forming step includes melting the solder in a plastic jacketing extruder.

12. The method of claim 6, wherein the forming step includes melting the solder in a plastic jacketing extruder.

13. An apparatus, comprising:
an elongate cable core extending from an input side of a heat source to an output side of the heat source;
a metallic laminate at least partially surrounding the cable core and having a first circumferential end and second circumferential end, wherein at least a portion of the first circumferential end overlaps at least a portion of the second circumferential end;
solder disposed proximate to at least one of the first circumferential end and the second circumferential end, wherein the solder is disposed radially inward of and in overlapping relation to both the first and second circumferential ends; and
a solder seal in contact with the first circumferential end and the second circumferential end across the overlapping portions of the first and second circumferential ends, the solder seal extending along a longitudinal axis of the core from proximate to the heat source to the output side of the heat source.

14. The apparatus of claim 13, wherein the solder is disposed on a metallic substrate disposed radially inward of the metallic laminate proximate to the heat source.

15. The apparatus of claim 13, further comprising a plastic jacket surrounding the metallic laminate, the jacket extending from proximate to the heat source to the output side of the heat source, and an adhesive radially inward of the portion of the first end and radially outward of the portion of the second end to adhere the overlapping portions of the first and second ends.

16. The apparatus of claim 15 wherein the heat source is a plastic jacketing extruder.

17. The apparatus of claim 13, wherein the solder is low temperature solder to a high voltage direct current.

* * * * *